(12) United States Patent
Yoshida et al.

(10) Patent No.: US 10,355,274 B2
(45) Date of Patent: Jul. 16, 2019

(54) ELECTRODE, NONAQUEOUS ELECTROLYTE BATTERY, BATTERY PACK AND VEHICLE

(71) Applicant: Kabushiki Kaisha Toshiba, Minato-ku (JP)

(72) Inventors: Yorikazu Yoshida, Yokohama (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 110 days.

(21) Appl. No.: 15/455,161

(22) Filed: Mar. 10, 2017

(65) Prior Publication Data
US 2017/0271667 A1  Sep. 21, 2017

(30) Foreign Application Priority Data
Mar. 17, 2016 (JP) .................. 2016-053598

(51) Int. Cl.
| | |
|---|---|
| *H01M 4/02* | (2006.01) |
| *H01M 4/36* | (2006.01) |
| *H01M 10/42* | (2006.01) |
| *H01M 10/0525* | (2010.01) |
| *H01M 4/485* | (2010.01) |
| *H01M 4/131* | (2010.01) |

(52) U.S. Cl.
CPC .......... *H01M 4/485* (2013.01); *H01M 4/131* (2013.01); *H01M 4/362* (2013.01); *H01M 4/364* (2013.01); *H01M 10/0525* (2013.01); *H01M 10/425* (2013.01); *H01M 2004/021* (2013.01); *H01M 2220/20* (2013.01); *Y02E 60/122* (2013.01); *Y02T 10/7011* (2013.01)

(58) Field of Classification Search
CPC ........ H01M 4/485; H01M 4/36; H01M 4/364; H01M 10/0525; H01M 10/42; H01M 10/425

See application file for complete search history.

(56) References Cited

U.S. PATENT DOCUMENTS

| | | |
|---|---|---|
| 2010/0216032 A1 | 8/2010 | Baba et al. |
| 2014/0308576 A1 | 10/2014 | Gaben et al. |
| 2015/0086872 A1 | 3/2015 | Ise et al. |

FOREIGN PATENT DOCUMENTS

| | | | |
|---|---|---|---|
| JP | 2010-287496 | 12/2010 | |
| JP | 2010287496 A | * 12/2010 | ............ H01M 4/485 |

(Continued)

OTHER PUBLICATIONS

C.M. Reich et al "Niobia Based Rutile Materials as SOFC Anodes", Fuel Cells No. 3-4, 2001, 7 pages.

(Continued)

*Primary Examiner* — Karie O'Neill Apicella
(74) *Attorney, Agent, or Firm* — Oblon, McClelland, Maier & Neustadt, L.L.P.

(57) ABSTRACT

According to one embodiment, an electrode is provided. The electrode includes active material particles containing a niobium-titanium composite oxide. The active material particles include a first active material particle, and a second active material particle located with a space between the first active material particle and the second active material particle.

12 Claims, 10 Drawing Sheets

(56) References Cited

FOREIGN PATENT DOCUMENTS

| JP | 2013-62242 | 4/2013 |
| JP | 2014-534592 | 12/2014 |
| JP | 2015-84321 | 4/2015 |
| KR | 10-2015-0032781 A | 3/2015 |
| WO | WO 2008/143027 A1 | 11/2008 |

OTHER PUBLICATIONS

Extended European Search Report dated Mar. 21, 2017 in Patent Application No. 17153906.7.

Saritha D., et al., "Studies on electrochemical lithium insertion in isostructural titanium niobate and tantalate phases with shear ReO3 structure" Materials Research Bulletin, vol. 48, No. 7, XP028535307, Mar. 30, 2013, pp. 2702-2706.

Xiaoyan Wen, et al., "Enhanced electrochemical properties of vanadium-doped titanium niobate as a new anode material for lithium-ion batteries" Electrochimica Acta, vol. 186, XP029340799, Oct. 30, 2015, pp. 58-63.

* cited by examiner

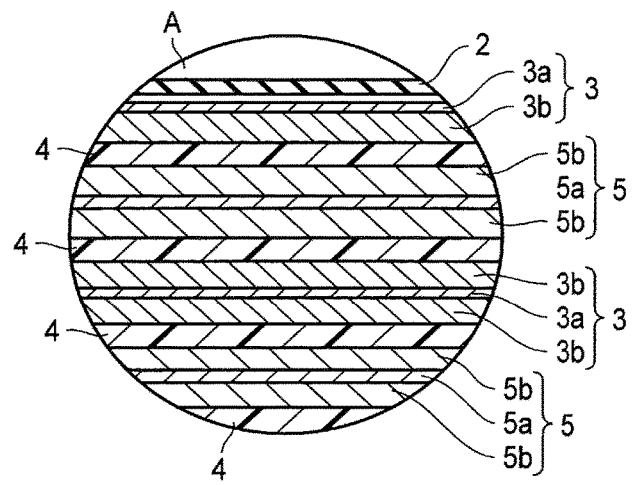
F I G. 7
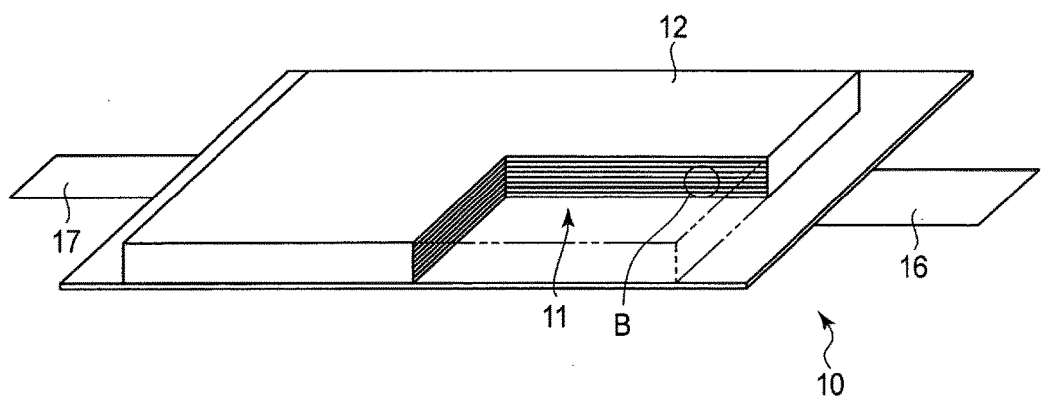
F I G. 8

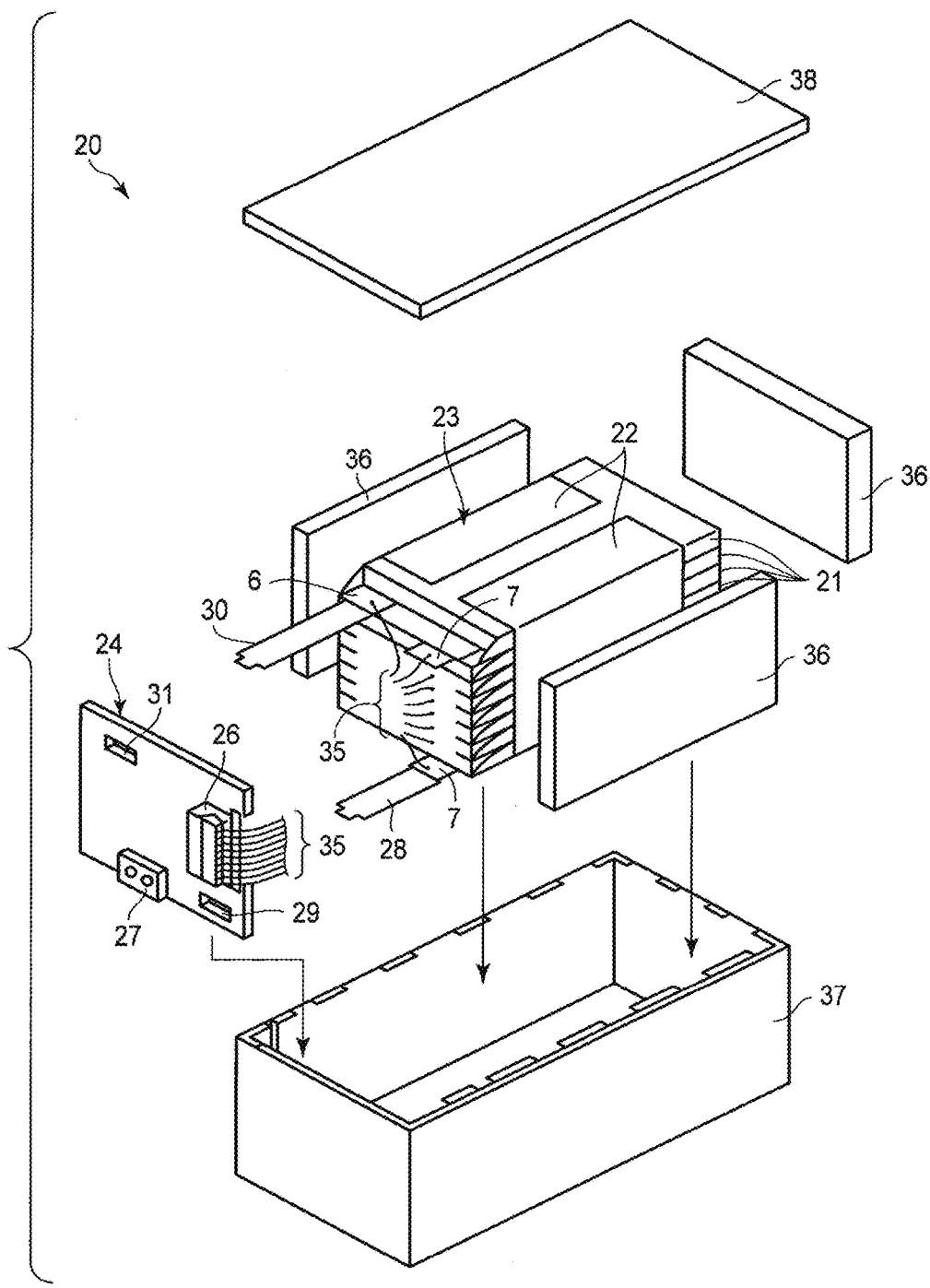
F I G. 10

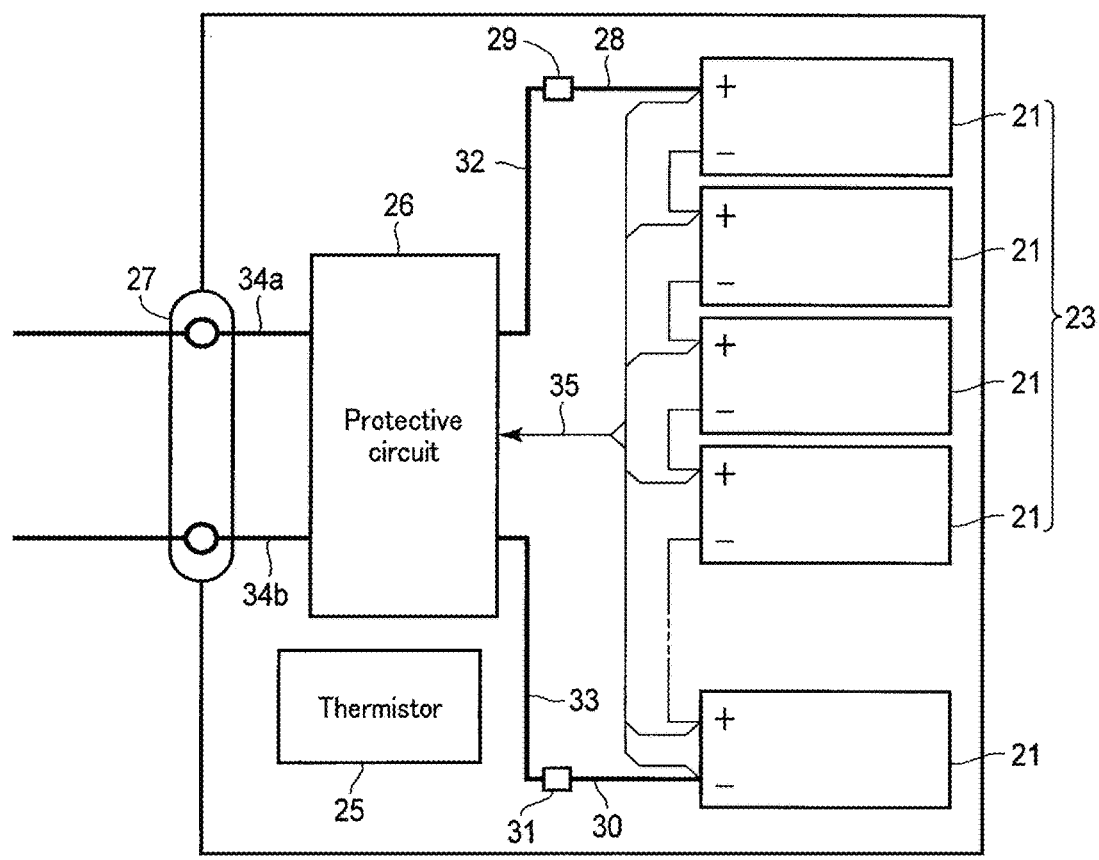
F I G. 11

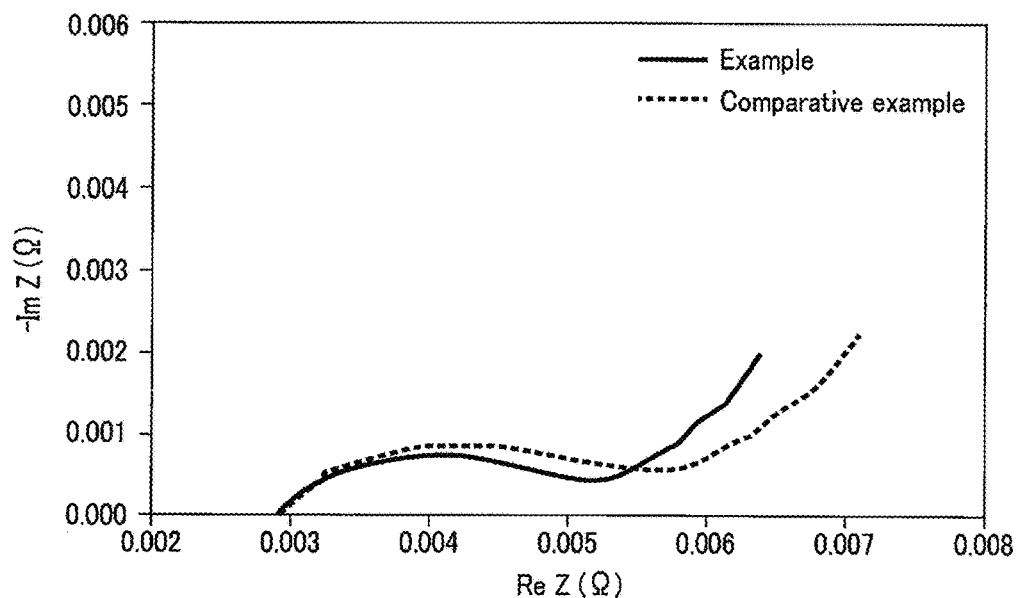
F I G. 12
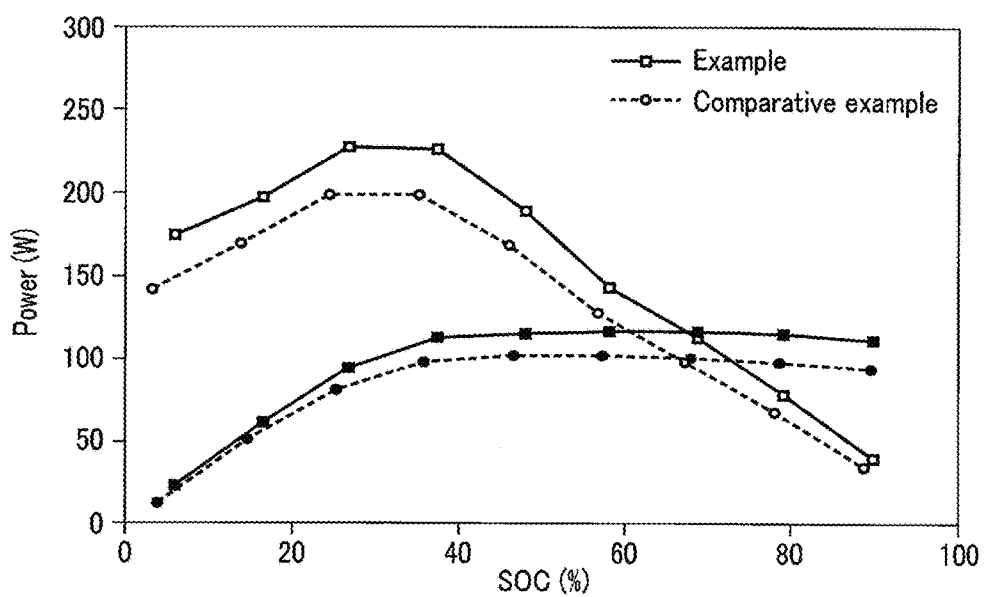
F I G. 13

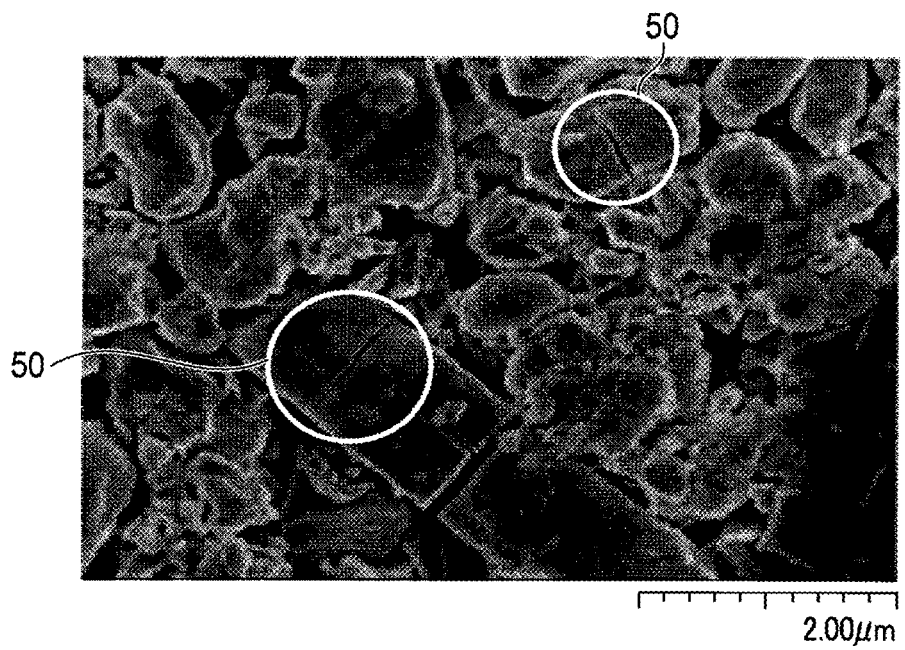
F I G. 14
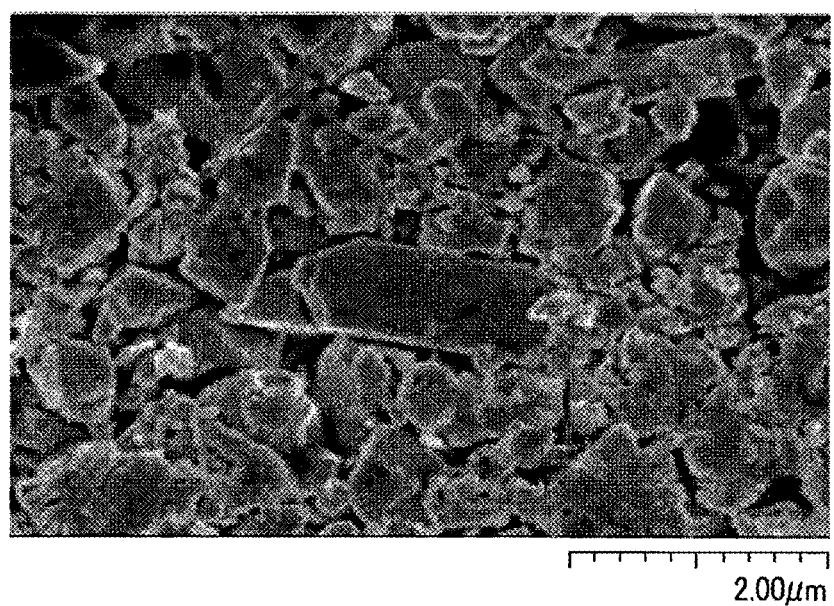
F I G. 15

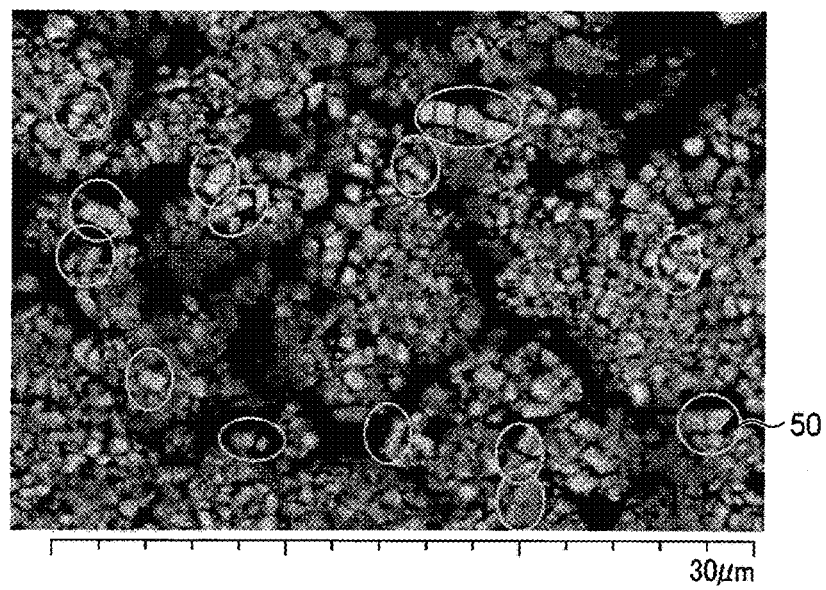
F I G. 16
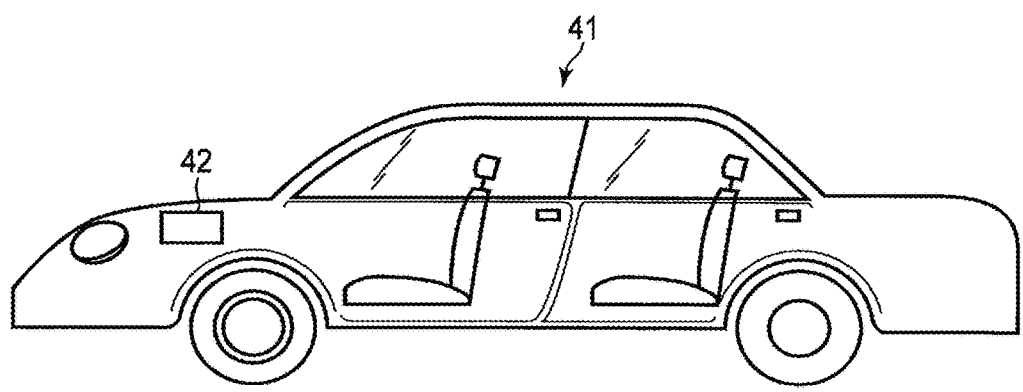
F I G. 17

ELECTRODE, NONAQUEOUS ELECTROLYTE BATTERY, BATTERY PACK AND VEHICLE

CROSS-REFERENCE TO RELATED APPLICATION

This application is based upon and claims the benefit of priority from Japanese Patent Application No. 2016-053598, filed Mar. 17, 2016, the entire contents of which are incorporated herein by reference.

FIELD

Embodiments of the present invention relate to an electrode, a nonaqueous electrolyte battery, a battery pack, and a vehicle.

BACKGROUND

Lithium ion nonaqueous electrolyte batteries have widely proliferated as batteries having a high energy density in various fields, including electric automobiles, power storage, and information devices. Due to this, demands on such batteries have increased, and studies thereof have gathered pace.

Especially, it is required for lithium ion nonaqueous electrolyte batteries used for a power source for electric automobiles to have a high energy density, i.e., to have a large discharge capacity per unit mass or unit volume, in view of their use. In addition, it is required that in order to regenerate kinetic energy during braking, efficient charge can be performed even if a large current is instantly input into a battery. Furthermore, it is required, contrary to the above, that a large output can be performed, i.e., a large current can be instantly discharged at the time of starting, sudden starting, or sudden acceleration. It is required, accordingly, for the secondary battery for the power source for the electric automobile, to have good input/output characteristics for a short time, in addition to a large capacity.

Carbon materials have been frequently used as a negative electrode active material in the lithium ion nonaqueous electrolyte battery. Recently, however, a spinel type lithium titanate having a higher Li insertion/extraction potential than that of the carbon material has received attention. The spinel type lithium titanate has excellent cycle characteristics because it has no volume change caused by a charge-and-discharge reaction. In addition, the spinel type lithium titanate has a high safety, because a possibility of generation of lithium dendrite is lower compared to a case where the carbon material is used, and has a great merit in which it is difficult to cause thermal runaway because it is a ceramic.

On the other hand, a nonaqueous electrolyte battery using the spinel type lithium titanate as a negative electrode active material has a defect of a low energy density, and thus negative electrode materials capable of obtaining a high capacity are required. Therefore, niobium-titanium composite oxides such as $Nb_2TiO_7$, which has a geometric capacity per mass larger than that of a spinel-type lithium titanate, $Li_4Ti_5O_{12}$, have been studied.

BRIEF DESCRIPTION OF THE DRAWING(S)

FIG. 7 is an enlarged cross-sectional view of a part A in FIG. 6;

FIG. 8 is a partially cutaway perspective view schematically showing another example of the nonaqueous electrolyte battery according to the second embodiment;

FIG. 10 is an exploded perspective view showing one example of battery packs according to a third embodiment;

FIG. 11 is a block diagram showing an electric circuit of the battery pack in FIG. 10;

FIG. 12 is a graph showing results in an AC impedance measurement of a secondary battery according to a concrete example;

FIG. 13 is a graph showing results in an HPPC (Hybrid Pulse Power Characterization) test of a secondary battery according to a concrete example;

FIG. 14 is an enlarged scanning electron microscope (SEM) photograph showing an active material-containing layer in a negative electrode according to Example;

FIG. 15 is an enlarged SEM photograph showing an active material-containing layer in a negative electrode according to Comparative Example;

FIG. 16 is an enlarged SEM photograph showing an active material-containing layer in an electrode according to the first embodiment; and FIG. 17 is a cross-sectional view schematically showing one example of vehicles according to a fourth embodiment.

DETAILED DESCRIPTION

Figure 1:
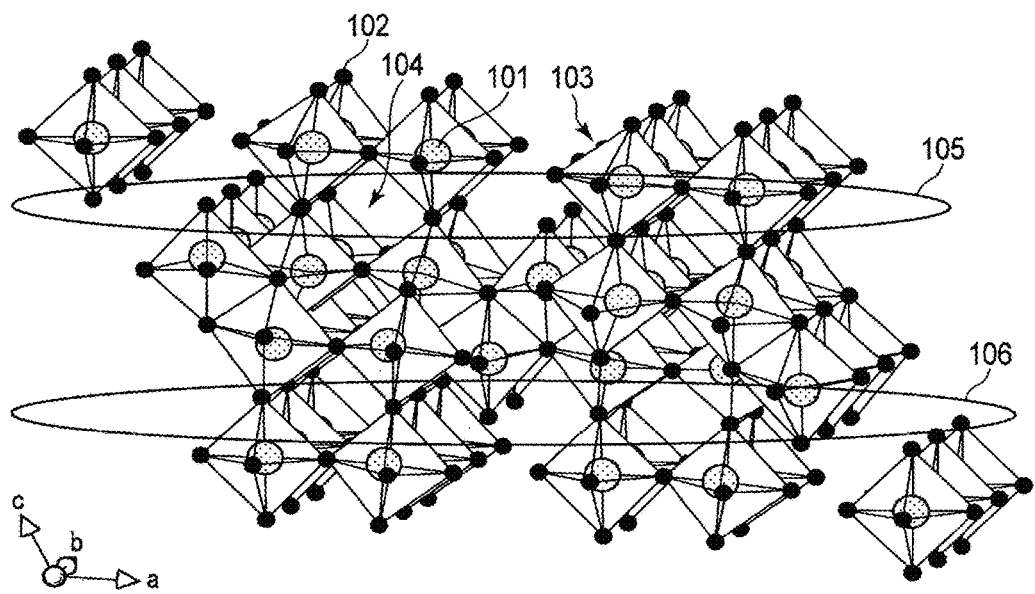
FIG. 1 is a schematic view showing a crystal structure of a niobium-titanium composite oxide, $Nb_2TiO_7$.

According to a first embodiment, an electrode is provided. The electrode includes active material particles containing a niobium-titanium composite oxide. The active material particles include a first active material particle, and a second active material particle located with a space between the first active material particle and the second active material particle. When a third line segment connects the midpoint of a first line segment which is brought into contact with the first active material particle and the second active material particle and does not cross the space to the midpoint of a second line segment which is brought into contact with the first active material particle and the second active material particle and does not cross the space, the space satisfies the following formulae (1) to (3):

$$0.8 \le a/b \le 1.2 \tag{1}$$

$$0.8 \le a/c \le 1.2 \tag{2}$$

$$0.8 \le b/c \le 1.2 \tag{3}$$

In the formulae, a is a length of a line segment A, which is the shortest distance between the first active material particle and the second active material particle at a position of 50% of a length of the third line segment; b is a length of a line segment B, which is the shortest distance between the first active material particle and the second active material particle at a position of 10% of the length of the third line segment; and c is a length of a line segment C, which is the shortest distance between the first active material particle and the second active material particle at a position of 90% of the length of the third line segment.

According to the second embodiment, a nonaqueous electrolyte battery is provided. The nonaqueous electrolyte battery includes a positive electrode, the electrode according to the first embodiment used as a negative electrode, and a nonaqueous electrolyte.

According to the third embodiment, a battery pack is provided. The battery pack includes a nonaqueous electrolyte battery according to the second embodiment.

According to a fourth embodiment, a vehicle is provided. The vehicle includes a battery pack according to the third embodiment.

Embodiments are explained below referring to drawings. In the following descriptions, the same reference number is applied to structural features having the same or similar function throughout all drawings, and overlapped explanations are omitted. Each drawing is a schematic view for explaining the embodiment and promoting the understanding thereof. Shapes, sizes and ratios in the drawing, accordingly, may be different from those in a practical apparatus, but they may be appropriately designed and changed considering the following descriptions and known technology.

First Embodiment

According to a first embodiment, an electrode is provided. The electrode includes active material particles containing a niobium-titanium composite oxide. The active material particles include a first active material particle, and a second active material particle located with a space between the first active material particle and the second active material particle. When a third line segment connects the midpoint of a first line segment which is brought into contact with the first active material particle and the second active material particle and does not cross the space to the midpoint of a second line segment which is brought into contact with the first active material particle and the second active material particle and does not cross the space, the space satisfies the following formulae (1) to (3):

$$0.8 \leq a/b \leq 1.2 \quad (1)$$

$$0.8 \leq a/c \leq 1.2 \quad (2)$$

$$0.8 \leq b/c \leq 1.2 \quad (3)$$

In the formulae, a is a length of a line segment A, which is the shortest distance between the first active material particle and the second active material particle at a position of 50% of a length of the third line segment; b is a length of a line segment B, which is the shortest distance between the first active material particle and the second active material particle at a position of 10% of the length of the third line segment; and c is a length of a line segment C, which is the shortest distance between the first active material particle and the second active material particle at a position of 90% of the length of the third line segment.

The electrode according to the present embodiment contains multiple active material particles containing a niobium-titanium composite oxide, wherein spaces formed by the active material particles satisfy the formulae (1) to (3) described above. As a result, an electrode having excellent capacity and rate characteristics can be obtained.

A crystal structure of a niobium-titanium composite oxide is not particularly limited. As one example, a crystal structure of a monoclinic niobium-titanium composite oxide is explained herein.

Figure 2:
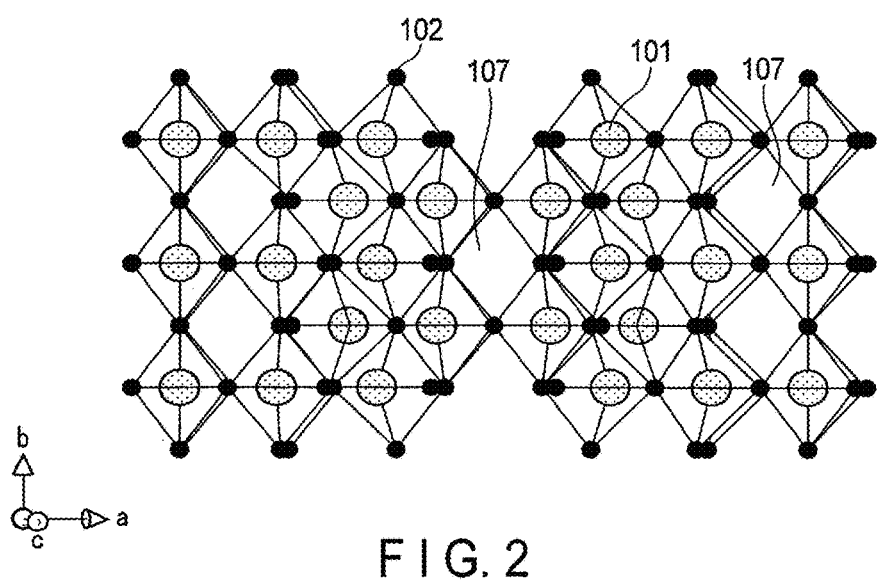
FIG. 2 is a schematic view showing in another direction the crystal structure in FIG. 1.

FIG. 1 is a schematic view showing a crystal structure of a niobium-titanium composite oxide, $Nb_2TiO_7$, which is one example of monoclinic niobium-titanium composite oxides. FIG. 2 is a schematic view showing the crystal structure in FIG. 1 when it is observed in another direction.

As shown in FIG. 1, in the crystal structure of the monoclinic niobium-titanium composite oxide $Nb_2TiO_7$, metal ions 101 and oxide ions 102 constitute skeleton structure portions 103. It should be noted that for the positions of the metal ions 101, a Nb ion and a Ti ion are arranged at random at a ratio of Nb:Ti=2:1. With the skeleton structure portions 103 arranged alternately and three-dimensionally, void portions 104 are present among the skeleton structure portions 103. This void portion 104 serves as a host of lithium ions. As shown in FIG. 1, the void portions 104 can account for a large part of the entire crystal structure. Moreover, even when lithium ions are inserted, a structure of the void portions 104 can be stably held.

In FIG. 1, a region 105 and a region 106 are portions having two-dimensional channels in the [100] direction and the [010] direction. As shown in FIG. 2, a void portions 107 are present in the [001] direction in the crystal structure of the monoclinic niobium-titanium composite oxide. The void portions 107 have a tunnel structure advantageous in conduction of lithium ions, and serve as a conductive path in the [001] direction, connecting between the region 105 and the region 106. The presence of this conductive path enables transfer of lithium ions between the regions 105 and 106.

As thus described, the crystal structure of the monoclinic niobium-titanium composite oxide $Nb_2TiO_7$ contains a space where lithium ions are equivalently inserted is large, and structurally stable. Further, there are present two-dimensional channels in which lithium ions are rapidly diffused, and conductive paths connecting these channels in the [001] direction. Accordingly, in the crystal structure of the monoclinic niobium-titanium composite oxide $Nb_2TiO_7$, performance of lithium ions to be inserted into and extracted from the insertion spaces improve, and the insertion and extraction spaces for lithium ions effectively increase. Thus, the monoclinic niobium-titanium composite oxide can exhibit a high capacity and high rate performance.

Further, in the above crystal structure, when lithium ions are inserted into the void portions 104, each of the metal ions 101 constituting the skeleton 103 is reduced to a trivalent state, and hence the crystal structure is held electrically neutral. In the monoclinic niobium-titanium composite oxide, not only Ti ions are reduced from a tetravalent state to a trivalent state, but also an Nb ions are reduced from a pentavalent state to a trivalent state. That is, the number of valences reduced per active material weight is large. For this reason, even when a large number of lithium ions are inserted, the crystal can be held electrically neutral. Accordingly, the monoclinic niobium-titanium composite oxide has higher energy density than that of a compound only containing a tetravalent cation, such as titanium oxide. Specifically, a theoretical capacity of the monoclinic niobium-titanium composite oxide is approximately 387 mAh/g, which is twice as large as or larger than that of titanium oxide having a spinel structure.

Further, the niobium-titanium composite oxide has a lithium insertion potential of approximately 1.5 V (vs. $Li/Li^+$). Hence, the use of the active material containing the monoclinic niobium-titanium composite oxide enables provision of a battery capable of stably and repeatedly performing rapid charge-and-discharge.

As described above, when the active material particles contained in the electrode according to the present embodiment are, for example, the monoclinic niobium-titanium composite oxide, the electrode having the excellent capacity and rate characteristics can be obtained.

Figure 3:
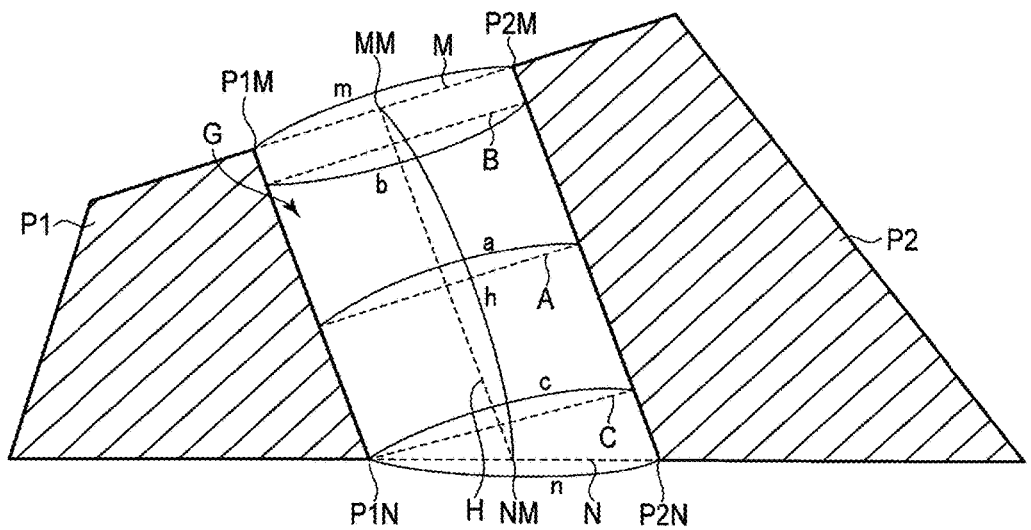
FIG. 3 is a plan view showing one example of spaces between particles contained in an electrode according to a first embodiment.
Figure 4:
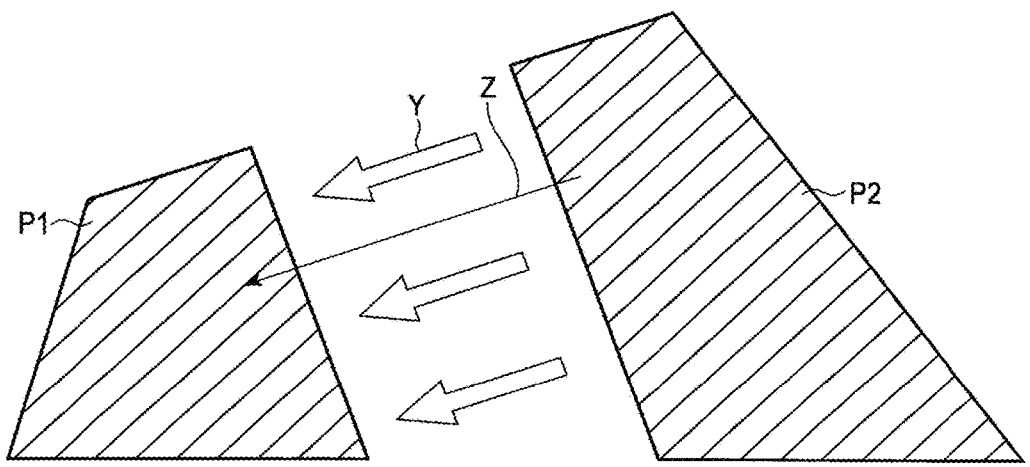
FIG. 4 is a plan view schematically showing an ionic conduction in the space shown in FIG. 3.
Figure 5:
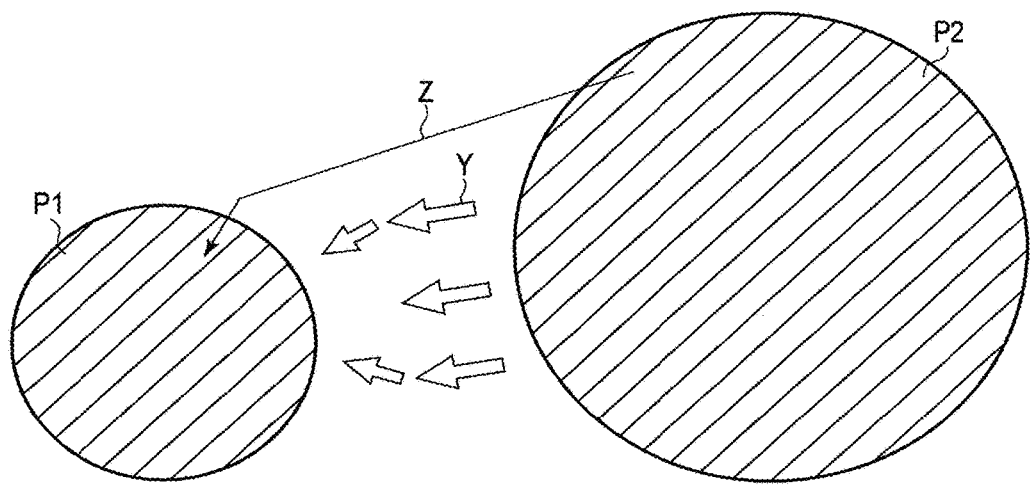
FIG. 5 is a plan view schematically showing ionic conduction in a space in Reference Example.

Next, referring to FIG. 3 to FIG. 5, the space between the active material particles contained in the electrode according to the present embodiment is explained. FIG. 3 is a plan view showing one example of spaces between the active material particles contained in the electrode according to the present embodiment. FIG. 4 is a plan view schematically showing an ionic conduction in the space shown in FIG. 3. FIG. 5 is a plan view schematically showing an ionic conduction in a space in Reference Example.

FIG. 3 depicts a state in which a first active material particle P1 (a particle P1) and a second active material particle P2 (a particle P2) adjacent thereto form a space G. Although the particle P1 and the particle P2 exist in a three-dimensional space, FIG. 3 shows a plan view to simplify the explanation. As shown in FIG. 3, the particle P1 and the particle P2 adjoin each other and are spaced some distance from each other. A part of a surface of the particle P1 and a part of a surface of the particle P2 face each other, and a space surrounded by them is defined as a space G.

A line segment M is a line segment which is brought into contact with the particle P1 and the particle P2. The line segment M is the tangent line at the point P1M. The line segment M is also the tangent line at the point P2M. When a length of this line segment M is defined as m, the length m can be expressed as a length from a point P1M at which the line segment M is brought into contact with the particle P1 to a point P2M at which the line segment M is brought into contact with the particle P2. A line segment N is another line segment which is brought into contact with the particle P1 and the particle P2. The line segment N is the tangent line at the point P1N. The line segment N is also the tangent line at the point P2N. When a length of this line segment N is defined as n, the length n can be expressed as a length from a point P1N at which the line segment N is brought into contact with the particle P1 to a point P2N at which the line segment N is brought into contact with the particle P2. Both the line segment M and the line segment N are line segments which do not cross the space G.

Here, in order to show that the particle P1 and the particle P2 adjoin each other and are spaced some distance from each other, the following definitions are further added. First, a line segment connected from the midpoint MM of the line segment M to the midpoint NM of the line segment N is defined as a line segment H and its length is defined as h. Next, a line segment, which intersects the line segment H at a position of 50% of a length of the line segment H, and connects the particle P1 to the particle P2 in the shortest distance is defined as a line segment A, and the length of the line segment A is defined as a. In addition, a line segment which intersects the line segment H at a position of 10% of the length of the line segment H, and connects the particle P1 to the particle P2 in the shortest distance is defined as a line segment B, and the length of the line segment B is defined as b. In addition, a line segment which intersects the line segment H at a position of 90% of the length of the line segment H, and connects the particle P1 to the particle P2 in the shortest distance is defined as a line segment C, and the length of the line segment C is defined as c.

When the starting point of the line segment H (a position of 0% of the length of the line segment H) is supposed as the midpoint MM of the line segment M, and the terminus of the line segment H (a position of 100% of the line segment H) is supposed as the midpoint of NM of the line segment N, a position of 10% of the length of the line segment H can be determined. A position of 50% of the length of the line segment H and a position of 90% of the length of the line segment H can also be determined as above.

An angle formed by the line segment H and the line segment A is not particularly limited so long as the line segment A passes over a position of 50% of the length of the line segment H. The angle formed by the line segment H and the line segment A may be 90°. An angle formed by the line segment H and the line segment B is not particularly limited so long as the line segment B passes over a position of 10% of the length of the line segment H. The angle formed by the line segment H and the line segment B may be 90°. An angle formed by the line segment H and the line segment C is not particularly limited so long as the line segment C passes through a position of 90% of the length of the line segment H. The angle formed by the line segment H and the line segment C may be 90°.

In the present embodiment, the space formed by the particle P1 and the particle P2 is a space satisfies the following formulae (1) to (3) regarding the length a of the line segment A, the length b of the line segment B, and the length c of the line segment C.

$$0.8 \leq a/b \leq 1.2 \tag{1}$$

$$0.8 \leq a/c \leq 1.2 \tag{2}$$

$$0.8 \leq b/c \leq 1.2 \tag{3}$$

When the ratio a/b satisfies the formula (1), the length of the line segment A is not excessively differed the length of the line segment B. When the ratio of a/c satisfies the formula (2), the length of the line segment A is not excessively differed the length of the line segment C. In addition, when the ratio of b/c satisfies the formula (3), the length of the line segment B is not excessively differed the length of the line segment C.

When the ratio a/b, the ratio a/c, and the ratio b/c satisfy the (1) to (3) described above, accordingly, a distance from a given position facing the particle P1 to the particle P2 on the surface of the particle P1 is highly likely equal to a distance from another position facing the particle P2 to the particle P2 on the surface of the particle P1. In this case, as shown in FIG. 4, a diffusion length Z of ions is short, because directions Y of ion conductive paths from the particle P2 to the particle P1 are comparatively uniform. The electrode according to the present embodiment, therefor, has the excellent capacity and rate characteristics.

For comparison, FIG. 5 shows an ionic conduction in a space in which (1) to (3) are not satisfied. In this case, there are parts where directions Y of ion conductive paths from the particle P2 to the particle P1 are not arranged to one direction, and thus there are parts where the diffusion length Z of ions is longer compared to the case of FIG. 4.

The particle size of the particle P1 is, for example, within a range of 0.1 μm to 100 μm, preferably a range of 0.5 μm to 50 μm, more preferably a range of 1 μm to 5 μm. The particle size of the particle P2 is, for example, within a range of 0.1 μm to 100 μm, preferably a range of 0.5 μm to 50 μm, more preferably a range of 1 μm to 5 μm. When the particle size of the active material particle is within a range of 0.1 μm to 100 μm, the resistance is decreased, and thus the electrode having the excellent rate characteristics can be obtained. The particle size of the particle P1 and the particle size of the particle P2 are preferably about the same size.

Subsequently, the electrode according to the present embodiment is explained in more detail.

The electrode according to the present embodiment may include a current collector. The current collector is desirably formed from a material which is electrochemically stable in a potential range nobler than 1.0 V (vs. Li/Li$^+$). Examples of the material may include aluminum, and aluminum alloy containing aluminum and at least one element selected from the group consisting of Mg, Ti, Zn, Mn, Fe, Cu, and Si.

The thickness of the current collector is, for example, 20 μm or less, preferably 15 μm or less. The purity of the aluminum foil is preferably 99% by mass or more. The aluminum alloy preferably contains an element of magnesium, zinc, silicon, or the like. On the other hand, it is preferable to adjust a content of a transition metal such as iron, copper, nickel, or chromium to 1% by mass or less.

The electrode may include an active material-containing layer formed on the current collector. The active material-containing layer may be carried on one side of the current collector or both sides thereof. The current collector may include a part where the active material-containing layer is not carried. This part can serve, for example, as an electrode tab.

The active material-containing layer includes the multiple active material particles containing the niobium-titanium composite oxide. The active material-containing layer may contain other active materials, and materials other than the active materials. The material other than the active material may contain, for example, a conductive agent and a binder.

The niobium-titanium composite oxide may include $Nb_2TiO_7$, $Nb_2Ti_2O_{19}$, $Nb_{10}Ti_2O_9$, $Nb_{24}TiO_{62}$, $Nb_{14}TiO_{37}$, $Nb_2Ti_2O_9$, and the like. The niobium-titanium composite oxide may be a substituted niobium-titanium composite oxide in which at least a part of Nb atoms and/or Ti atoms are substituted by dopants. Examples of the substituted element may be V, Cr, Mo, Ta, Zr, Mn, Fe, Mg, B, Pb, Al, and the like. The substituted niobium-titanium composite oxide may contain one kind of the substituted element, or may contain multiple kinds of the substituted elements. The active material particles may contain one kind of the niobium-titanium composite oxide, or may contain two or more kinds of the niobium-titanium composite oxides. The niobium-titanium composite oxide preferably contains the monoclinic niobium-titanium composite oxide, $Nb_2TiO_7$. In this case, as described above, the electrode having the excellent capacity and rate characteristics can be obtained.

As the other active material, for example, a titanium oxide can be used. As the titanium oxide, any titanium oxide can be used without any particular limitation so long as lithium can be inserted therein and extracted therefrom. For example, it is possible to use a spinel-type lithium titanate, a ramsdellite-type lithium titanate, a titanium-containing metal composite oxide, a niobium oxide and composite oxides thereof, titanium dioxide containing a monoclinic crystal structure ($TiO_2(B)$), an anatase-type titanium dioxide, or the like.

The spinel-type lithium titanate may include $Li_{4+x}Ti_5O_{12}$ wherein x varies in a range of $-1 \leq x \leq 3$ depending on the charge-and-discharge reaction, and the like. The ramsdellite-type lithium titanate may include $Li_{2+y}Ti_3O_7$ wherein y varies in a range of $-1 \leq y \leq 3$ depending on the charge-and-discharge reaction, and the like. $TiO_2(B)$ and the anatase-type titanium dioxide may include $Li_{1+z}TiO_2$ wherein z varies in a range of $-1 \leq z \leq 0$ depending on the charge-and-discharge reaction, and the like.

The titanium-containing metal composite oxide may include metal composite oxide containing Ti and at least one element selected from the group consisting of P, V, Sn, Cu, Ni, and Fe, and the like. The metal composite oxide containing Ti and at least one element selected from the group consisting of P, V, Sn, Cu, Ni, and Fe may include, for example, $TiO_2$—$P_2O_5$, $TiO_2$—$V_2O_5$, $TiO_2$—$P_2O_5$—$SnO_2$, $TiO_2$—$P_2O_5$-MeO wherein Me is at least one element selected from the group consisting of Cu, Ni, and Fe, and the like.

It is preferable that the metal composite oxides described above have a low crystallinity and a microstructure in which both crystal phases and amorphous phases exist or only an amorphous phase exists. The microstructure can further improve the cycle performance.

The conductive agent improves a current collecting performance, and has an effect of reducing a contact resistance between the active material and the current collector. Examples of the conductive agent may include carbonaceous substances such as acetylene black, carbon black, graphite, carbon nanofiber, and carbon nanotube. As the conductive agent, the carbonaceous substances may be used alone or as a mixture of multiple carbonaceous substances.

The binder has an effect of binding the active material, the conductive agent, and the current collector. Examples of the binder may include polytetrafluoroethylene (PTFE), polyvinylidene fluoride (PVdF), fluororubber, styrene-butadiene rubber, acrylic resins and copolymers thereof, polyacrylic acid, polyacrylonitrile, and the like. The binders described above may be used alone or as a mixture of multiple binders.

It is preferable to mix the active material, the conductive agent, and the binder in contents of 70% by mass to 96% by mass, 2% by mass to 28% by mass, and 2% by mass to 28% by mass, respectively. When the conductive agent is used in a content of 2% by mass or more, the effects described above can be exhibited. In order to obtain a high capacity, it is preferable that the contents of the conductive agent and the binder are 28% by mass or less.

The electrode according to the present embodiment can be produced, for example, as described below.

First, an active material containing a niobium-titanium composite oxide is produced in the following procedures. First, as starting materials, oxides or salts containing optionally Ti, Nb, and Zr are prepared. As one example, when a monoclinic niobium-titanium composite oxide is synthesized, it is possible to use, as a starting material, an oxide such as titanium dioxide or niobium pentoxide. It is preferable to use, as a salt which is used as a starting material, a salt capable of decomposing at a comparatively low temperature to generate an oxide, such as a hydroxide salt, a carbonate or a nitrate, and niobium hydroxide and zirconium hydroxide are appropriate.

Next, the obtained mixture is pulverized, thereby obtaining a mixture as uniform as possible. Next, the obtained mixture is fired. The firing is performed, for example, at a temperature range of 900° C. to 1400° C. over 1 to 100 hours in total hours.

The niobium-titanium composite oxide can be obtained as the active material in the steps described above. When a compound containing lithium, such as lithium carbonate, is used as the starting material, a composite oxide containing lithium can be synthesized.

Subsequently, the active material synthesized as above, a conductive agent, and a binder are prepared. These are suspended in an appropriate solvent, and the resulting suspension is coated on one side or both sides of a current collector such as an aluminum foil and dried. After the suspension is dried, the resulting current collector is pressed to produce an electrode. The obtained electrode is, for example, a belt-shaped electrode. If necessary, the electrode may be cut before or after the press.

A nonaqueous electrolyte battery is prepared using the obtained electrode, for example, as the negative electrode, and using a positive electrode and nonaqueous electrolyte, which are produced in a known method. The obtained battery is subjected to an initial charge, for example, in an environment of −30° C. to 20° C. The initial charge is performed preferably in an environment of −20° C. to 0° C., more preferably −15° C. to 5° C. The initial charge is performed in a constant current and constant voltage mode, for example, of 0.1 C to 5 C, preferably 0.2 C to 1 C, for example, over 5 hours to 10 hours. A cut-off potential is adjusted, for example, to 2.85 V. When this initial charge is performed, a load is applied to the active material particles, and thus the active material particles are broken. As a result, the electrode having the spaces according to the present embodiment can be obtained. When the initial charge is performed at a large current, the active material particles are easily broken, and thus the electrode having the more excellent capacity and rate characteristics can be obtained. A battery containing the electrode is, if necessary, subjected to an initial discharge and aging, after the initial charge, after which it can be used.

The cause leading to the breakage of the active material particles is unknown, but it is thought to result from the non-uniformity of the composition in the active material particle. For example, as described above, assume a case of the active material containing the niobium-titanium composite oxide in the solid phase reaction. When a compound which is prepared as the Nb source and a compound which is prepared as the Ti source, which are prepared as the starting materials, are different in a particle size from each other, the starting materials are mixed and fired, parts in which the speed of Nb diffusion or Ti diffusion is slow exist in the produced solid; that is, these starting materials are not uniformly reacted and, for example, an Nb-rich phase is generated. As a result, heterogenous phases different from the desired composition and defects exist in the produced active material particle. As the heterogenous phase, for example, when $Nb_2TiO_7$ is produced, $Nb_{10}Ti_2O_{29}$, $Nb_{14}TiO_{37}$, $Nb_{24}TiO_{62}$, or the like may be produced.

According to a study carried out by the present inventors, it is found that although there are no crystallographic cleavage surfaces, the direction of the breaking of the active material particle is mostly the direction [010], i.e., a direction vertical to the axis C extended by the insertion of Li. This suggests the possibility in which the breakage is generated with the heterogenous phase or the defect as the starting point, as described above. The active material particle contained in the electrode according to the present embodiment may contain the active material particles which are broken with the heterogenous phase or the defect as the starting point.

FIG. 16 is an enlarged SEM photograph showing an active material-containing layer of the electrode according to the present embodiment. A specific observation method according to SEM is described below. In the SEM photograph, a method of roughly estimating the number of broken active material particles is explained.

First, in the SEM image shown in FIG. 16, it is supposed that niobium-titanium composite oxide particles whose secondary particle size is in a range of 1 μm to 50 μm exist in a content of about 97% of the total number of the niobium-titanium composite oxide particles in the particle size distribution. It is further supposed that an average secondary particle size of the niobium-titanium composite oxide particles, which exist on a plane observed on the SEM image, is about 8 μm. The number of niobium-titanium composite oxide particles existing on the plane observed on the SEM image can be, accordingly, calculated as below.

900 μm$^2$/8 μm×97/100=110 (particles)

In the SEM image shown in FIG. 16, it can be considered that 14 active material particles 50, surrounded by a circle, are broken. Thus, the 14 active material particles in the 110 particles are broken, and the 14 broken particles (pairs of 14 particles) satisfy the formulae (1) to (3) described above. That is, each of the broken particles according to the present embodiment may have the space satisfying the formulae (1) to (3) described above.

From the calculation of 14/110×100=12.7%, it can be calculated, accordingly, that in the SEM image shown in FIG. 16, about 12.7% of the active material particles in the niobium-titanium composite oxide particles existing on the plane observed satisfy the formulae (1) to (3) described above.

When the active material-containing layer is observed by SEM, for example, about 0.1% to 95%, relative to the total number of the active material particles existing on a 30 μm×30 μm plane, of the active material particles may be broken. Alternatively, 10% to 20% of the active material particles may be broken.

In other words, the number of 0.1% to 95% of the active material particles, relative to the total number of the active material particles existing on a 30 μm×30 μm area of the scanning electron microscope image of the active material-containing layer, may exist in a broken state.

Next, a method of measuring each parameter of the electrode according to the present embodiment is explained.

<Method of Disassembling Battery>

When the electrode of the present embodiment is incorporated into a battery, the electrode can be taken out, for example as described below. First, the battery is put into a state-of-discharge. For example, the battery is discharged at a 0.1 C current up to a rated final voltage in an environment of 25° C., whereby the battery can be put into the state-of-discharge. Next, the battery in the state-of-discharge is disassembled, and an electrode (for example, a negative electrode) is taken out. The taken out electrode is washed, for example, with methyl ethyl carbonate. Thus, the electrode to be measured is obtained.

<Confirmation of Structure of Electrode>

A structure of the electrode can be confirmed by, for example, observing a cross section of the electrode by means of a scanning electron microscope (SEM).

As the measuring apparatus, for example, a field-emission scanning electron microscope SU 8020, Hitachi High-Technologies Corporation, can be used. The measuring conditions are: illumination voltage: 3 KV; focal length: 10.1 mm; and magnification: 20000 times.

<Method of Measuring Primary Particle Size>

The average primary particle size of the active material can be confirmed by a scanning electron microscope (SEM) observation. For the measurement, a laser diffraction particle size distribution measurement apparatus (Shimadzu SALD-300) is used. The average primary particle size is determined by obtaining an average value of 10 typical particles, which are extracted from a typical field of vision.

<Method of Measuring Secondary Particle Size>

The method of measuring an average particle size of the secondary particle is as follows: First, using a laser diffraction distribution measuring apparatus (Shimadzu SALD-300), about 0.1 g of a sample, a surfactant, and 1 to 2 mL of distilled water are added to a beaker, and the mixture is thoroughly stirred. After that, the resulting solution is poured into a stirring water tank, and a light intensity distribution is measured 64 times at 2-second intervals to analyze the particle size distribution data.

According to the first embodiment, the electrode is provided. The electrode includes active material particles containing a niobium-titanium composite oxide. The active material particles include a first active material particle, and a second active material particle located with a space between the first active material particle and the second active material particle. When a third line segment connects the midpoint of a first line segment which is brought into contact with the first active material particle and the second active material particle and does not cross the space to the midpoint of a second line segment which is brought into contact with the first active material particle and the second active material particle and does not cross the space, the space satisfies the following formulae (1) to (3):

$$0.8 \leq a/b \leq 1.2 \quad (1)$$

$$0.8 \leq a/c \leq 1.2 \quad (2)$$

$$0.8 \leq b/c \leq 1.2 \quad (3)$$

In the formulae, a is a length of a line segment A, which is the shortest distance between the first active material particle and the second active material particle at a position of 50% of a length of the third line segment; b is a length of a line segment B, which is the shortest distance between the first active material particle and the second active material particle at a position of 10% of the length of the third line segment; and c is a length of a line segment C, which is the shortest distance between the first active material particle and the second active material particle at a position of 90% of the length of the third line segment.

The active material particles contained in the electrode have a short ion diffusion distance between the particles containing the niobium-titanium composite oxide and adjacent to each other, and thus the nonaqueous electrolyte battery having the excellent capacity and rate characteristics can be realized.

Second Embodiment

According to the second embodiment, a nonaqueous electrolyte battery is provided. The nonaqueous electrolyte battery includes a positive electrode, the electrode according to the first embodiment used as a negative electrode, and a nonaqueous electrolyte. The nonaqueous electrolyte battery may further include a separator, a container member, a positive electrode terminal, and a negative electrode terminal.

An electrode group can be formed from the positive electrode and the negative electrode, and the separator put between them. The nonaqueous electrolyte can be held in the electrode group. The container member can house the electrode group and the nonaqueous electrolyte. The positive electrode terminal can be electrically connected to the positive electrode. The negative electrode terminal can be electrically connected to the negative electrode.

The positive electrode, the negative electrode, the nonaqueous electrolyte, the separator, the container member, the positive electrode terminal, and the negative electrode terminal are explained in detail below.

1) Positive Electrode

The positive electrode includes a positive electrode current collector, and a positive electrode active material-containing layer(s) carried on one side or both sides of the positive electrode current collector and having active material particles, a conductive agent and a binder.

The positive electrode current collector is preferably formed of an aluminum foil, or an aluminum alloy foil containing at least one element selected from the group consisting of Mg, Ti, Zn, Mn, Fe, Cu, and Si. The aluminum foil or the aluminum alloy foil has a thickness, for example, of 20 μm or less, more preferably 15 μm or less. The aluminum foil has preferably a purity of 99% by mass or more. As the aluminum alloy, alloys containing an element of magnesium, zinc, silicon, or the like are preferable. On the other hand, a content of a transition metal such as iron, copper, nickel or chromium is preferably 1% or less.

As the positive electrode active material, various oxides, sulfides, and polymers can be used. Examples thereof may include manganese dioxide ($MnO_2$), iron oxide, copper oxide, and nickel oxide, which contain lithium; lithium-manganese composite oxides (for example, $Li_xMn_2O_4$ or $Li_xMnO_2$); lithium-nickel composite oxides (for example, $Li_xNiO_2$); lithium-cobalt composite oxides ($Li_xCoO_2$); lithium-nickel-cobalt composite oxides (for example, $LiNi_{1-y}Co_yO_2$); lithium-manganese-cobalt composite oxides (for example, $LiMn_yCo_{1-y}O_2$); spinel-type lithium-manganese-nickel composite oxide ($Li_xMn_{2-y}Ni_yO_4$); lithium phosphate compounds having an olivine structure ($Li_xFePO_4$, $Li_xFe_{1-y}Mn_yPO_4$, $Li_xCoPO_4$, and the like); iron sulfate ($Fe_2(SO_4)_3$); vanadium oxides (for example $V_2O_5$), and the like. The positive electrode active material may also include organic materials and inorganic materials such as conductive polymer materials such as polyaniline and polypyrrole, disulfide polymer materials, sulfur (S), and carbon fluoride. These positive electrode active materials may be used alone or as a mixture of two or more kinds.

A more preferable positive electrode active material for the secondary battery may include materials capable of obtaining a high battery voltage. Examples thereof may include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel-type lithium-manganese-nickel composite oxide ($Li_xMn_{2-y}Ni_yO_4$), lithium-manganese-cobalt composite oxide ($Li_xMn_yCo_{1-y}O_2$), lithium iron phosphate ($Li_xFePO_4$), and the like. In the formulae described above, it is preferable that x and y are within a range of 0 to 1.

It is also possible to use, as the positive electrode active material, a lithium-nickel-cobalt-manganese composite oxide having a composition represented by $Li_aNi_bCo_cMn_dO_2$ wherein molar ratios of a, b, c, and d are within ranges of $0 \leq a \leq 1.1$, $0.1 \leq b \leq 0.5$, $0 \leq c \leq 0.9$, and $0.1 \leq d \leq 0.5$.

When a nonaqueous electrolyte containing an ambient temperature molten salt, described below, is used, it is preferable to use lithium iron phosphate, $Li_xVPO_4F$, lithium-manganese composite oxides, lithium-nickel composite oxides, or lithium-nickel-cobalt composite oxides, in terms of the cycle lifetime. In this case, the reactivity between the positive electrode active material and the ambient temperature molten salt is decreased.

The conductive agent is mixed as the occasion demands, in order to enhance the current collecting performance, and suppress the contact resistance between the active material and the current collector. Examples of the conductive agent may include carbonaceous substances such as acetylene black, Ketjen black, graphite and/or coke. The carbonaceous substances may be used alone or as a mixture of the multiple carbonaceous substances as the conductive agent.

The binder has an effect to bind the active material, the conductive agent, and the current collector. As the binder, for example, it is possible to use at least one member selected from the group consisting of polytetrafluoroethylene (PTFE), polyvinylidene fluoride (PVdF), cellulose materials such as sodium carboxymethyl cellulose (CMC), fluororubber, styrene-butadiene rubber, acrylic resin or copolymers thereof, polyacrylic acid, and polyacrylonitrile, though the binder is not limited thereto.

The positive electrode active material particles, the conductive agent, and the binder are preferably mixed in content ranges of 80 to 95% by mass of the positive electrode active material particles, 3 to 18% by mass of the conductive agent, and 2 to 17% by mass of the binder.

2) Negative Electrode

As the negative electrode, the electrode stated in the explanation of the first embodiment can be used.

3) Nonaqueous Electrolyte

The nonaqueous electrolyte may be, for example, a liquid nonaqueous electrolyte, prepared by dissolving an electrolyte in an organic solvent, or gel nonaqueous electrolyte obtained by combining the liquid electrolyte with a polymer material. The nonaqueous electrolyte may contain an additive.

The liquid nonaqueous electrolyte in which the electrolyte is dissolved in a concentration of 0.5 mole/L to 2.5 mole/L in an organic solvent is preferable.

Examples of the electrolyte may include lithium salts such as lithium perchlorate ($LiClO_4$), lithium hexafluorophosphate ($LiPF_6$), lithium tetrafluoroborate ($LiBF_4$), lithium arsenic hexafluoride ($LiAsF_6$), lithium trifluoromethane sulfonate ($LiCF_3SO_3$), lithium bis(trifluoromethylsulfonyl)imide [$LiN(CF_3SO_2)_2$], and mixtures thereof. Electrolytes which are rarely oxidized even at a high voltage are preferable, and $LiPF_6$ is the most preferable.

Examples of the organic solvent may include cyclic carbonates such as propylene carbonate (PC), ethylene carbonate (EC), and vinylene carbonate; linear carbonates such as diethyl carbonate (DEC), dimethyl carbonate (DMC), and methyl ethyl carbonate (MEC); cyclic ethers such as tetrahydrofran (THF), 2-methyl tetrahydrofran (2MeTHF) and dioxolane (DOX); linear ethers such as dimethoxyethane (DME) and diethoxyethane (DEE); acetonitrile (AN); and sulfolane (SL). The organic solvent may be used alone or as a mixture thereof.

Examples of the polymer material may include polyvinylidene fluoride (PVdF), polyacrylonitrile (PAN), and polyethylene oxide (PEO).

Alternatively, as the nonaqueous electrolyte, an ambient temperature molten salt (ionic melts) containing lithium ions, a solid polymer electrolyte, or a solid inorganic electrolyte may be used.

The ambient temperature molten salt (ionic melts) means compounds which can exist in a liquid state at ambient temperature (15 to 25° C.) among organic salts constituted of combinations of organic cations and anions. The ambient temperature molten salt includes an ambient temperature molten salt which exists alone as a liquid, an ambient temperature molten salt which becomes a liquid after being mixed with an electrolyte, and an ambient temperature molten salt which becomes a liquid after being dissolved in an organic solvent. In general, the melting point of the ambient temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

4) Separator

The separator is disposed between the positive electrode and the negative electrode.

As the separator contents, a porous film or synthetic resin non-woven fabric containing, for example, at least one selected from the group consisting of polyethylene, polypropylene, polyethylene terephthalate, cellulose, and polyvinylidene fluoride (PVdF) may be used. Alternatively, a separator in which a porous film is coated with an inorganic compound can be used.

5) Container Member

As the container member, for example, a laminate film or metal container can be used.

The shape of the container member may include a flat-type (a thin-type), a square-type, a cylindrical type, a coin-type, a button-type, a sheet-type, laminate-type, and the like. The container member may have a size according to a battery size. The container member has a size used for, for example, a compact battery loaded on a portable electronic device, or a large size battery loaded on vehicles such as two-wheeled to four-wheeled automobiles.

As the laminate film, a multilayer film in which a metal layer is disposed between resin films is used. The laminate film has preferably a thickness of 0.2 mm or less. An aluminum foil or an aluminum alloy foil is preferably used as the metal layer, in order to reduce the weight. As the resin film, a polymer material such as polypropylene (PP), polyethylene (PE), nylon, or polyethylene terephthalate (PET) can be used. The laminate film can be formed into a shape of the container member sealing the film by heat seal.

The metal container has preferably a thickness of 0.5 mm or less, more preferably 0.2 mm or less.

The metal container is, for example, formed from aluminum, aluminum alloy, or the like. The aluminum alloy preferably contains an element of magnesium, zinc, silicon, or the like. When the alloy contains a transition metal such as iron, copper, nickel, or chromium, the content thereof is preferably adjusted to 100 ppm or less, whereby the long-term reliability and the heat dissipation in an environment of high temperatures can be dramatically improved.

6) Positive Electrode Terminal

The positive electrode terminal can be formed, for example, from a material having a potential within a range of 3 V to 4.5 V relative to lithium (vs $Li/Li^+$) and having the electrical stability and the conductivity. Specifically, the material may include aluminum alloy containing an element of Mg, Ti, Zn, Mn, Fe, Cu, or Si, and aluminum. In order to reduce the contact resistance, it is preferable to use the same material as that of the positive electrode current collector.

7) Negative Electrode Terminal

The negative electrode terminal can be formed, for example, from a material having a potential within a range of 0.4 V to 3 V relative to lithium (vs $Li/Li^+$) and having the electrical stability and the conductivity. Specifically, the material may include aluminum alloy containing an element of Mg, Ti, Zn, Mn, Fe, Cu, or Si, and aluminum. In order to reduce the contact resistance, it is preferable to use the same material as that of the negative electrode current collector.

Next, some examples of the nonaqueous electrolyte batteries according to the present embodiment are explained, referring to the drawings.

Figure 6:
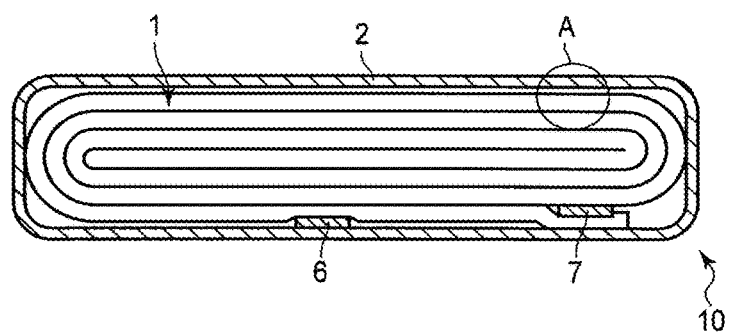
FIG. 6 is a cross-sectional view showing one example of nonaqueous electrolyte batteries according to a second embodiment.

First, referring to FIG. 6 and FIG. 7, a flat-type nonaqueous electrolyte battery, which is one example of the nonaqueous electrolyte batteries according to the present embodiment, is explained.

FIG. 6 is a cross-sectional schematic view showing one example of the flat-type nonaqueous electrolyte batteries according to the present embodiment. FIG. 7 is an enlarged cross-sectional view showing a part A in FIG. 6.

The nonaqueous electrolyte battery 10, shown in FIG. 6 and FIG. 7, includes a flat wound electrode group 1.

The flat wound electrode group 1, as shown in FIG. 7, includes negative electrodes 3, separators 4, and positive electrodes 5. The separator 4 is disposed between the negative electrode 3 and the positive electrode 5. Such a flat wound electrode group 1 can be formed by spirally winding a laminate formed by laminating the negative electrode 3, the separator 4 and the positive electrode 5, the negative electrode 3 being arranged outward, as shown in FIG. 7, and performing press molding. In the laminate, the lamination is performed so that the separator 4 is disposed between the negative electrode 3 and the positive electrode 5.

The negative electrode 3 includes negative electrode current collectors 3a and negative electrode active material-containing layers 3b. The outermost negative electrode 3 has a structure, as shown in FIG. 7, in which the negative electrode active material-containing layer 3b is formed only on the inside surface of the negative electrode current collector 3a. In the other negative electrodes 3, the negative electrode active material-containing layers 3b are formed on both sides of the negative electrode current collector 3a.

In the positive electrode 5, the positive electrode active material-containing layers 5b are formed on both sides of the positive electrode current collector 5a.

As shown in FIG. 6 and FIG. 7, in the vicinity of an external peripheral edge of the wound electrode group 1, a negative electrode terminal 6 is connected to a negative electrode current collector 3a of the outermost negative electrode 3, and a positive electrode terminal 7 is connected to a positive electrode current collector 5a of the inside surface of the positive electrode 5.

The wound electrode group 1 is housed in a bag-shaped container 2 formed from a laminate film in which a metal layer is disposed between two resin layers.

The negative electrode terminal 6 and the positive electrode terminal 7 are extended outward from an opening of the bag-shaped container 2. For example, liquid nonaqueous electrolyte is injected from the opening of the bag-shaped container 2, and housed in the bag-shaped container 2.

The negative electrode terminal 6 and the positive electrode terminal 7 are disposed in the opening of the bag-shaped container 2, which is heat-sealed, whereby the wound electrode group 1 and the liquid nonaqueous electrolyte are completely sealed.

Figure 9:
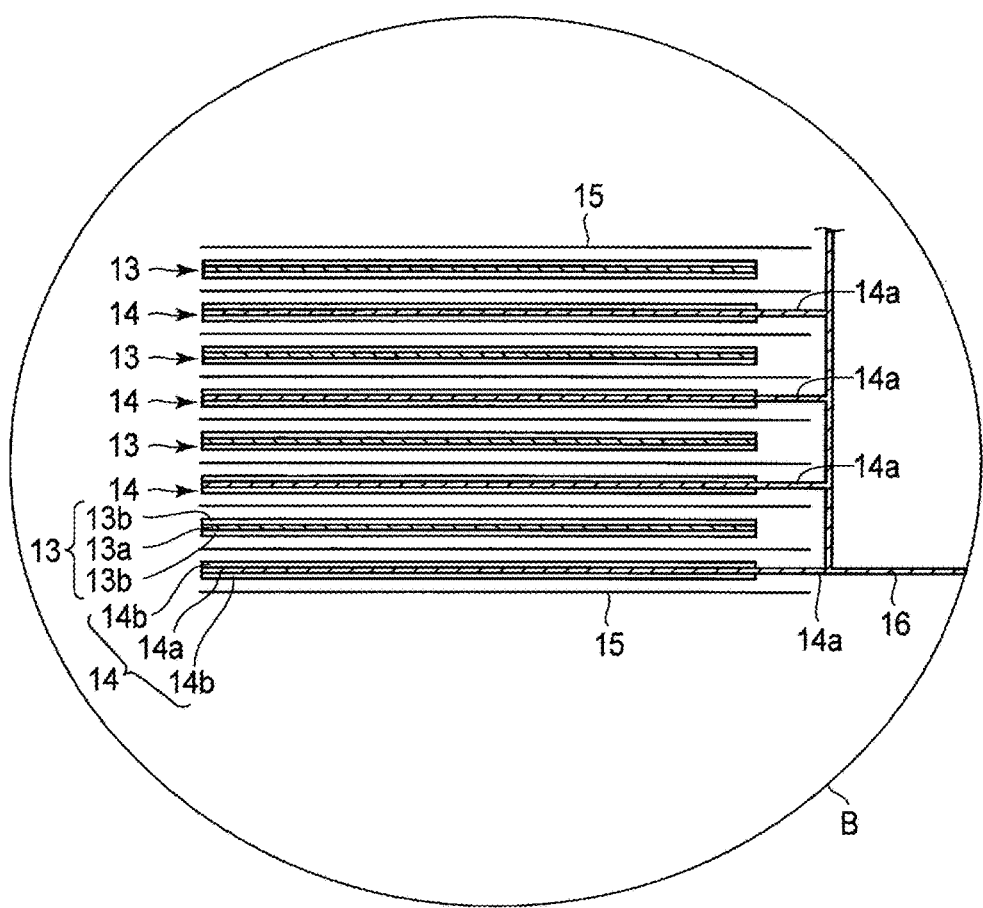
FIG. 9 is an enlarged cross-sectional view of a part B in FIG. 8.

Next, referring to FIG. 8 and FIG. 9, another example of the nonaqueous electrolyte battery according to the present embodiment is explained.

FIG. 8 is a cutaway perspective view schematically showing another example of the nonaqueous electrolyte battery according to the present embodiment. FIG. 9 is a cross-sectional schematic view showing a part B in FIG. 8.

A nonaqueous electrolyte battery 10, shown in FIG. 8 and FIG. 9, includes a laminate-type electrode group 11. As shown in FIG. 8, the laminate-type electrode group 11 is housed in a container member 12 formed from a laminate film in which a metal layer is disposed between two resin films. As shown in FIG. 9, the laminate-type electrode group 11 has a structure in which positive electrodes 13 and negative electrodes 14 are alternately laminated, separators 15 being disposed between them. There are multiple positive electrodes 13, and each of them includes a positive electrode current collector 13a, and positive electrode active material-containing layers 13b carried on both sides of the positive electrode current collector 13a. There are multiple negative electrodes 14, and each of them includes a negative electrode current collector 14a, and negative electrode active material-containing layers 14b carried on both sides of the negative electrode current collector 14a. One side of the negative electrode current collector 14a of each negative electrode 14 protrudes from the negative electrode 14. The protruding negative electrode current collector 14a is electrically connected to a belt-shaped negative electrode terminal 16. A tip of the belt-shaped negative electrode terminal 16 is drawn out outward from the container member 12. In the positive electrode current collector 13a of the positive electrode 13, a side, located on the opposite side to the protruding side of the negative electrode current collector 14a, protrudes from the positive electrode 13, which is not shown in the drawing. The positive electrode current collector 13a protruding from the positive electrode 13 is electrically connected to the belt-shaped positive electrode terminal 17, which also is not shown in the drawing. A tip of the belt-shaped positive electrode terminal 17 is located on the opposite side to the negative electrode terminal 16, and is drawn out outward from the side of the container member 12.

The nonaqueous electrolyte battery according to the second embodiment includes the electrode according to the first embodiment, and thus the nonaqueous electrolyte battery having the excellent capacity and rate characteristics can be obtained.

Third Embodiment

According to the third embodiment, a battery pack is provided. The battery pack includes a nonaqueous electrolyte battery according to the second embodiment.

The battery pack according to the present embodiment may include one nonaqueous electrolyte battery or multiple nonaqueous electrolyte batteries. The multiple nonaqueous electrolyte batteries, which can be included in the battery pack, can be electrically connected in series, in parallel, or in combination of in series and in parallel. The multiple nonaqueous electrolyte batteries are electrically connected to each other to form a battery module. The battery pack may include the multiple battery modules.

The battery pack may further include a protective circuit. The protective circuit controls the charge-and-discharge of the nonaqueous electrolyte battery. A circuit, included in a device (such as an electronic device or an automobile) using a battery pack as a power source, can be used as the protective circuit for the battery pack.

The battery pack may further contain an external power distribution terminal. The external power distribution terminal is used in order to output a current from the nonaqueous electrolyte battery and to input a current into the nonaqueous electrolyte battery; in other words, the current is supplied to the outside through the external power distribution terminal when the battery pack is used as the power source. When the battery pack is charged, the charge current (including a regenerative energy of a power of an automobile) is supplied to the battery pack through the external power distribution terminal.

Next, one example of battery packs according to the present embodiment is explained, referring to the drawings.

FIG. 10 is an exploded perspective view showing one example of the battery packs according to the present embodiment. FIG. 11 is a block diagram showing an electric circuit of the battery pack shown in FIG. 10.

The battery pack 20, shown in FIG. 10 and FIG. 11, contains multiple flat-type unit cells 21 having the structure shown in FIG. 6 and FIG. 7.

The multiple unit cells 21 are laminated so that the negative electrode terminal 6 and the positive electrode terminal 7, which extend outward, are arranged in the same direction, and the laminate is fastened by a pressure-sensitive adhesive tape 22, thereby forming a battery module 23. These unit cells 21 are electrically connected to each other in series, as shown in FIG. 11.

A printed wiring board 24 is located facing a side surface from which the negative electrode terminals 6 and the positive electrode terminals 7 of the multiple unit cells 21 extend. A thermistor 25, a protective circuit 26, and an energizing terminal 27 to external devices, which are shown in FIG. 11, are loaded on the printed wiring board 24. An insulating plate (not shown) is attached to a surface printed wiring board 24 of the facing the battery module 23, in order to avoid unnecessary connection with wirings of the battery module 23.

A positive electrode-side lead 28 is connected to a positive electrode terminal 7 of a unit cell 21 located at the undermost layer of the battery module 23, and the tip thereof is inserted into a positive electrode-side connector 29 of the printed wiring board 24, thereby electrically connecting them to each other. A negative electrode-side lead 30 is connected to a negative electrode terminal 6 of a unit cell 21 located at the uppermost layer of the battery module 23, and the tip thereof is inserted into a negative electrode-side connector 31 of the printed wiring board 24, thereby electrically connecting them to each other. These connectors 29 and 31 are connected to the protective circuit 26 through the wirings 32 and 33, formed on the printed wiring board 24, respectively.

The thermistor 25 detects a temperature of each unit cell 21, and transmits the detection signals to the protective circuit 26. The protective circuit 26 can block a plus-side wiring 34a and a minus-side wiring 34b between the protective circuit 26 and the energizing terminal 27 to the external device in a pre-determined condition. An example of the pre-determined condition is a case where a signal in which a temperature of the unit cell 21 is a pre-determined temperature or more is received from the thermistor 25. Alternatively, another example of the pre-determined condition is a case where an over-charge, over-discharge, over-current, or the like of the unit cell 21 is detected. The detection of the over-charge, or the like is performed in each unit cell 21 or the battery module 23. When each unit cell 21 is detected, a battery voltage may be detected, or a positive electrode potential or a negative electrode potential may be detected. In the latter case, a lithium electrode, which is used as a reference electrode, is inserted into each unit cell 21. In the battery pack, shown in FIG. 10 and FIG. 11, a wiring 35 is connected to each unit cell 21, in order to detect the voltage, and the detection signals are transmitted to the protective circuit 26 through the wirings 35.

Among the four surfaces of the battery module 23, on three surface, excluding the side surface from which the positive electrode terminal 7 and the negative electrode terminal 6 protrude, are disposed protective sheets 36 formed from rubber or a resin.

The battery module 23 is housed in a storage container 37 together with the protective sheets 36 and the printed wiring board 24. The protective sheets 36 are disposed on both inside surfaces in a long-side direction of the storage container 37 and one inside surface in a short-side direction. The printed wiring board 24 is disposed on an inside surface facing the inside surface in the short-side direction of the storage container 37, on which the protective sheet 36 is disposed. The battery module 23 is located in a space surrounded by the protective sheets 36 and the printed wiring board 24. A lid 38 is attached to an upper surface of the storage container 37.

In order to fix the battery module 23, a heat-shrinkable tape may be used instead of the pressure-sensitive adhesive tape 22. In this case, the protective sheets are disposed on the both side surfaces of the battery module 23, which is wound with the heat-shrinkable tape, and then the heat-shrinkable tape 23 is heat-shrunk to unite the battery module.

The battery pack 20 shown in FIG. 10 and FIG. 11 has a form in which the multiple unit cells 21 are connected to each other in series, but in order to increase the battery capacity, in the battery pack 20, the multiple unit cells 21 may be connected to each other in parallel. Alternatively, the battery pack 20 may include the multiple unit cells 21 connected to each other in combination of series connections and parallel connections. It is possible to further electrically connect the battery packs 20 to each other in series or in parallel.

The battery pack 20, shown in FIG. 10 and FIG. 11, includes the multiple unit cells 21, but the battery pack 20 may include one unit cell 21.

The embodiment of the battery pack may be appropriately varied depending on the use thereof. The battery pack according to the present embodiment is preferably used for an application required to have the excellent lifetime property when a large current is taken out. Specifically, for example, it is used as a power source for a digital camera, for a battery loaded on vehicles such as two-wheel to four-wheel hybrid electric automobiles, two-wheel to four-wheel electric automobiles, and assist bicycles, for stationary battery, or for rail way car. In particular, it is preferably used as the battery loaded on the vehicle.

In a vehicle having the battery pack according to the present embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and electric trains.

The battery pack according to the third embodiment includes the nonaqueous electrolyte battery of the second embodiment. For that reason, the battery pack including the nonaqueous electrolyte battery having the excellent capacity and rate characteristics can be obtained.

Fourth Embodiment

According to a fourth embodiment, a vehicle is provided. The vehicle includes a battery pack according to the third embodiment.

FIG. 17 shows an example of an automobile as a vehicle which includes the battery pack according to the third embodiment.

The automobile 41 shown in FIG. 17 includes a battery pack 42 which is an example of the battery pack according to the third embodiment mounted in its engine room. The mounting position is not limited to engine rooms. For example, the battery pack may also be mounted in rear parts of automobiles or under seats.

The vehicle according to the fourth embodiment contains the battery pack according to the third embodiment. For that reason, the vehicle containing the secondary battery having the high capacity and the excellent discharge performance at low temperatures can be obtained.

EXAMPLES

The embodiments are explained in more detail by means of the Examples below, but the embodiments are not limited to the Examples described below, so long as they are not beyond the gist of the invention.

Example 1

<Production of Positive Electrode>

By weight, 90% of lithium-nickel-cobalt-manganese composite oxide ($LiNi_{0.5}CO_{0.2}Mn_{0.3}O_2$) as the positive electrode active material, 5% by weight of acetylene black as the conductive agent, and 5% by weight of polyvinylidene fluoride (PVdF) as the binder were added to and mixed with N-methyl pyrrolidone (NMP) to prepare a slurry. The slurry was coated on both sides of a current collector formed from an aluminum foil having a thickness of 15 μm, which was dried and pressed to prepare a positive electrode having an electrode density of 3.2 g/cm$^3$.

<Production of Negative Electrode>

An active material containing niobium-titanium composite oxide was produced in the following procedures. First, niobium oxide, $Nb_2O_5$, and titanium oxide, $TiO_2$, were prepared as starting materials. The powders thereof were mixed in a molar ratio of 2:1 to prepare a mixture. The obtained mixture was put in an agate pot, to which ethanol and agate beads were added, and the mixture was pulverized in a wet bead mill. The pulverized mixture was fired at 1000° C. over 12 hours. Thus, a monoclinic niobium-titanium composite oxide ($Nb_2TiO_7$) was obtained.

By weight, 84% of the monoclinic niobium-titanium composite oxide obtained above as a negative electrode active material, 8% by weight of acetylene black as a conductive agent, and 8% by weight of polyvinylidene fluoride (PVdF) as a binder were added to and mixed with N-methyl pyrrolidone (NMP) to prepare a slurry. The slurry was coated on one side of a current collector formed from an aluminum foil having a thickness of 12 μm, which was dried and pressed to produce a negative electrode having an electrode density of 2.6 g/cm$^3$.

<Preparation of Nonaqueous Electrolyte>

Propylene carbonate (PC) and diethyl carbonate (DEC) were mixed in a volume ratio of 1:1 to prepare a mixed solvent. In the mixed solvent was dissolved 1 M of $LiPF_6$, which was an electrolyte, to prepare a nonaqueous electrolyte.

<Production of Secondary Battery>

The nonaqueous electrolyte was injected to a laminate film pack in which the electrode group was housed. After that, the pack was completely sealed by heat-sealing to produce a laminate-type nonaqueous electrolyte secondary battery.

<Initial Charge-and-Discharge>

The produced laminate-type nonaqueous electrolyte secondary battery was subjected to charge-and-discharge in an environment of −10° C. The cut-off potential was adjusted to 2.85 V to 1.5 v. The charge was performed in a 1 C constant current and constant voltage mode over 3 hours, and the discharge was performed in a 0.2 C constant current mode. Thus, a secondary battery according to Example 1 was obtained.

Comparative Example 1

A secondary battery was produced in the same manner as in Example 1, except that the temperature was changed to 25° C. at the first charge-and-discharge.

<AC Impedance Measurement>

AC impedances of the secondary batteries produced in Example 1 and Comparative Example 1 were measured in the following conditions. As a device, Solartron SI 1287 manufactured by Solartron, was used. As a thermostatic chamber, ESPEC SU-641, manufactured by Espec Corp. was used and the temperature was adjusted to 25° C. A sweep frequency range was adjusted to 1000 kHz to 0.05 Hz, and an AC supply voltage was adjusted to 10 mV.

The results are shown in FIG. 12. FIG. 12 is a complex impedance plot showing the results of the AC impedance measurements of the secondary batteries according to Example 1 and Comparative Example 1. From FIG. 12, it is found that a resistance at a grain boundary in the secondary battery according to Example 1 is smaller compared to Comparative Example 1; in other words, the secondary battery according to Example 1 is more excellent in the rate characteristics.

<Input/Output Characteristic Test>

In order to check an input/output characteristic, an HPPC (Hybrid Pulse Power Characterization) test was performed. Conditions in the HPPC test are described below. The HPPC test is based on the U.S. Department of Energy, Freedom CAR Battery Test Manual for Power-Assist Hybrid Electric Vehicles (October, 2003).

A 1 C charge was performed at 2.85 V in a constant current and constant voltage mode in an environment of 25° C. A finish time of this charge was set at 3 hours. After that, the state-of-charge (SOC) is decreased by 10%, and 10-second pulsed current of 2.5 C was applied. After that, SOC was further decreased by 10%, and 10-second pulsed current was applied. As described above, the SOC was decreased by 10%, and in each SOC, a 10-second pulsed current of 2.5 C was applied. From a voltage difference between OCV and the voltage measured at the pulse is applied, a 10-second output and a 10-second resistance were calculated. The results are shown in FIG. 13.

In FIG. 13, lines in which each point is depicted white show charging characteristics, and lines in which each point is painted in black show output characteristics. In addition, lines in which each point is depicted as a square show the measurement results of the secondary battery according to Example 1, and lines in which each point is depicted as a circle show the measurement results of the secondary battery according to Comparative Example 1.

From FIG. 13, it is found that the secondary battery according to Example 1 is more excellent both in the charging characteristic and the output characteristic regardless of the SOC value. For example, it is found that the output characteristic in 50% of SOC in Example 1 is about 10% more excellent compared to Comparative Example 1.

<Confirmation of Electrode Structure>

The negative electrode was taken out from each secondary battery produced in Example 1 and Comparative Example 1 in the following procedures. First, the battery was discharged at 0.1 C current in an environment of 25° C. up to the rated final voltage, whereby the battery in the state-of-discharge was obtained. Next, the battery in the state-of-discharge was disassembled and the negative electrode was taken out. The taken out negative electrode was washed with methyl ethyl carbonate.

The thus taken out negative electrode was observed using SEM. As the measuring apparatus, a field-emission scanning electron microscope SU 8020, Hitachi High-Technologies Corporation, was used. The measuring conditions were: illumination voltage: 3 KV; focal length: 10.1 mm; and magnification: 20000 times. The results are shown in FIG. 14 and FIG. 15. FIG. 14 is an enlarged SEM photograph showing a part of the negative electrode according to Example 1. FIG. 15 is an enlarged SEM photograph showing a part of the negative electrode according to Comparative Example 1.

In the SEM image in FIG. 14, it is found that a space between two particles surrounded by a circle 50 satisfies the formulae (1) to (3). It is found that in the SEM image in FIG. 14, for example, a space between particles surrounded by a circle 50 in a lower-left part, has a/b of 0.87, a/c of 0.91, and b/c of 1.05. On the other hand, it is found that in the SEM image in FIG. 15, there are no spaces between particles satisfying the formulae (1) to (3).

In the SEM image according to Example 1 (FIG. 14), when pairs of particles forming the spaces satisfying the formulae (1) to (3) were observed, one particle had a primary particle size of 3 μm, and the other particle adjacent thereto had a primary particle size of 2 μm. On the other hand, active material particles in Comparative Example 1 had an average primary particle size of 5 μm.

The electrode according to at least one of the embodiments and Examples described above includes the active material particles containing the niobium-titanium composite oxide. The active material particles include the first active material particle, and the second active material particle located with space between the first active material particle and the second active material particle. When a third line segment connects the midpoint of a first line segment which is brought into contact with the first active material particle and the second active material particle and does not cross the space to the midpoint of a second line segment which is brought into contact with the first active material particle and the second active material particle and does not cross the space, the space satisfies the following formulae (1) to (3):

$$0.8 \leq a/b \leq 1.2 \quad (1)$$

$$0.8 \leq a/c \leq 1.2 \quad (2)$$

$$0.8 \leq b/c \leq 1.2 \quad (3)$$

In the formulae, a is a length of a line segment A, which is the shortest distance between the first active material particle and the second active material particle at a position of 50% of a length of the third line segment; b is a length of a line segment B, which is the shortest distance between the first active material particle and the second active material particle at a position of 10% of the length of the third line segment; and c is a length of a line segment C, which is the shortest distance between the first active material particle and the second active material particle at a position of 90% of the length of the third line segment. The electrode according to the first embodiment can realize the nonaqueous electrolyte battery having the excellent capacity and rate characteristics, because it has the structure described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electrode comprising an active material-containing layer which comprises a plurality of active material particles containing a niobium-titanium composite oxide, wherein
the plurality of active material particles comprise at least one pair of a first active material particle and a second active material particle, and the second active material particle is located with a space between the first active material particle and the second active material particle,
when a third line segment connects a midpoint of a first line segment which is in contact with the first active material particle and the second active material particle and does not cross the space to a midpoint of a second line segment which is in contact with the first active material particle and the second active material particle and does not cross the space,
the space satisfies the following formulae (1) to (3):

$$0.8 \leq a/b \leq 1.2 \quad (1)$$

$$0.8 \leq a/c \leq 1.2 \quad (2)$$

$$0.8 \leq b/c \leq 1.2 \quad (3)$$

where a is a length of a line segment A, which is a shortest distance between the first active material particle and the second active material particle at a position of 50% of a length of the third line segment; b is a length of a line segment B, which is a shortest distance between the first active material particle and the second active material particle at a position of 10% of the length of the third line segment; and c is a length of a line segment C, which is a shortest distance between the first active material particle and the second active material particle at a position of 90% of the length of the third line segment, and
a number of the at least one pair is 0.1% to 95% with respect to a total number of the active material particles existing on a 30 μm×30 μm area of a scanning electron microscope image of the active material-containing layer.

2. The electrode according to claim 1, wherein the first active material particle has a particle size within a range of 0.1 μm to 100 μm, and the second active material particle has a particle size within a range of 0.1 μm to 100 μm.

3. The electrode according to claim 1,
wherein the number of the at least one pair is 10% to 20% with respect to the total number of the active material particles.

4. The electrode according to claim 1, wherein the niobium-titanium composite oxide comprises at least one selected from the group consisting of $Nb_2TiO_7$, $Nb_2Ti_2O_{19}$, $Nb_{10}Ti_2O_9$, $Nb_{24}TiO_{62}$, $Nb_{14}TiO_{37}$, and $Nb_2Ti_2O_9$.

5. The electrode according to claim 4, wherein the niobium-titanium composite oxide comprises $Nb_2TiO_7$ as a main phase, and comprises at least one selected from the group consisting of $Nb_{10}Ti_2O_9$, $Nb_{14}TiO_{37}$, and $Nb_{24}TiO_{62}$ as a heterogenous phase.

6. A nonaqueous electrolyte battery comprising:
a positive electrode;
a negative electrode using the electrode according to claim 1; and
a nonaqueous electrolyte.

7. A battery pack comprising the nonaqueous electrolyte battery according to claim 6.

8. The battery pack according to claim 7, further comprising:
an external power distribution terminal; and
a protective circuit.

9. The battery pack according to claim 7, wherein
the battery pack comprises a plural of nonaqueous electrolyte batteries, and
the plural of the nonaqueous electrolyte batteries are electrically connected in series, in parallel, or in combination of in series and in parallel.

10. A vehicle comprising the battery pack according to claim 7.

11. The vehicle according to claim 10, wherein the battery pack is configured to recover a regenerative energy of a power of the vehicle.

12. The electrode according to claim 1, wherein the total number of the active material particles is a sum of the number of the at least one pair and a number of the active material particles other than the at least one pair.

* * * * *